(12) United States Patent
Reed et al.

(10) Patent No.: US 8,150,417 B2
(45) Date of Patent: Apr. 3, 2012

(54) MOBILE DEVICE LOCATION SYSTEMS AND METHODS

(75) Inventors: Keith Reed, London (GB); Thai-Binh Phan, London (GB)

(73) Assignee: Actix Limited (GB)

( * ) Notice: Subject to any disclaimer, the term of this patent is extended or adjusted under 35 U.S.C. 154(b) by 864 days.

(21) Appl. No.: 11/597,092

(22) PCT Filed: May 21, 2004

(86) PCT No.: PCT/GB2004/002206
§ 371 (c)(1),
(2), (4) Date: Feb. 3, 2009

(87) PCT Pub. No.: WO2005/115040
PCT Pub. Date: Dec. 1, 2005

(65) Prior Publication Data
US 2009/0209271 A1    Aug. 20, 2009

(51) Int. Cl.
*H04W 24/00* (2009.01)
*G01S 3/02* (2006.01)
*G01C 21/00* (2006.01)

(52) U.S. Cl. .............. 455/456.1; 342/450; 701/207

(58) Field of Classification Search ....... 455/456.1–457; 701/207; 342/357.2–357.78, 450
See application file for complete search history.

(56) References Cited

U.S. PATENT DOCUMENTS

| | | | |
|---|---|---|---|
| 3,419,865 A | 12/1968 | Chisholm | |
| 4,217,588 A | 8/1980 | Freeny, Jr. | |
| 5,023,900 A | 6/1991 | Tayloe et al. | |
| 5,055,851 A | 10/1991 | Sheffer | |
| 5,208,756 A | 5/1993 | Song | |
| 5,657,487 A | 8/1997 | Doner | |
| 5,717,406 A | 2/1998 | Sanderford et al. | |
| 5,915,449 A | 6/1999 | Schwartz | |
| 6,052,597 A * | 4/2000 | Ekstrom | 455/456.3 |
| 6,084,547 A | 7/2000 | Sanderford et al. | |
| 6,266,514 B1 | 7/2001 | O'Donnell | |

(Continued)

FOREIGN PATENT DOCUMENTS

EP    1237389    9/2002

(Continued)

OTHER PUBLICATIONS

"Written Opinion of the International Searching Authority for Application No. PCT/GB2004/002206", 7 Pages.

(Continued)

*Primary Examiner* — Matthew Sams
(74) *Attorney, Agent, or Firm* — Schwegman, Lundberg & Woessner, P.A.

(57) ABSTRACT

A method of locating a mobile communications device, in particular on a known path, the mobile device communicating with a mobile communications network infrastructure including a plurality of base stations, communications between the mobile device and the base station to which it is attached having a timing advance to compensate for a time taken for a radio signal to reach the base station from the mobile device, the method comprising: reading a time ordered sequence of messages captured from said communications between the mobile device and said network infrastructure; reading timing advance information from said captured messages; identifying a step change in timing advance using said timing advance information; and determining a location of said mobile devices, in particular on said path, at a time of said step change.

21 Claims, 12 Drawing Sheets

U.S. PATENT DOCUMENTS

| | | | |
|---|---|---|---|
| 6,381,463 B1 * | 4/2002 | Tu et al. | 455/456.5 |
| 6,456,825 B1 | 9/2002 | Lowdon | |
| 6,459,954 B1 | 10/2002 | Kratzenberg | |
| 6,950,664 B2 * | 9/2005 | Chen et al. | 455/456.5 |
| 2002/0138195 A1 * | 9/2002 | Watanabe | 701/207 |
| 2002/0147023 A1 | 10/2002 | Sawada et al. | |
| 2003/0060213 A1 * | 3/2003 | Heinonen et al. | 455/456 |
| 2003/0139188 A1 * | 7/2003 | Chen et al. | 455/456 |
| 2004/0067759 A1 * | 4/2004 | Spirito et al. | 455/456.1 |
| 2004/0203921 A1 * | 10/2004 | Bromhead et al. | 455/456.1 |
| 2005/0239478 A1 * | 10/2005 | Spirito | 455/456.1 |

FOREIGN PATENT DOCUMENTS

| | | |
|---|---|---|
| EP | 1296531 A1 | 3/2003 |
| EP | 1328132 | 7/2003 |
| GB | 2336972 | 11/1999 |
| WO | WO 96/39638 | 12/1996 |
| WO | WO 98/35511 | 8/1998 |
| WO | WO 99/56491 | 11/1999 |
| WO | WO 00/28755 | 5/2000 |
| WO | WO 00/28756 | 5/2000 |
| WO | WO 03/047280 | 6/2003 |
| WO | WO 2005/071890 | 8/2005 |

OTHER PUBLICATIONS

Garcia C L et al: "Demand modeling and growth planning for TDMA-based wireless networks" Wireless Communications and Networking Conference, 1999. WCNC. 1999 IEEE New Orleans, LA, USA Sep. 21-24, 1999, Piscataway, NJ, USA,IEEE, US, Sep. 21, 1999, pp. 433-436, XP010353832 ISBN: 0-7803-5668-3.

"International Application No. PCT/GB2004/002206, International Search Report mailed Feb. 7, 2005", 3 pgs.

* cited by examiner

MOBILE DEVICE LOCATION SYSTEMS AND METHODS

RELATED APPLICATIONS

This application is a nationalization under 35 U.S.C. 371 of PCT/GB2004/002206, filed May 21, 2004 and published as WO 2005/115040 A1, on Dec. 1, 2005, which application and publication are incorporated herein by reference and made a part hereof.

This invention is generally concerned with computer systems, methods and computer program codes for determining a location of a mobile communications device moving along a known path, and more particularly for adding location information to "drive" test data captured from a mobile device. Embodiments of the invention are particularly useful for "drive" testing on high-speed trains.

Many techniques are known for accurately locating the position of a mobile communications device such as a mobile phone or PDA (Personal Digital Assistant) for emergency purposes and/or providing location-dependent services to a user. A system which employs signal time-of-flight/arrival with delay spread multipath effects corrected by a neural net trained using GPS (Global Positioning System) is described in U.S. Pat. No. 5,717,406, U.S. Pat. No. 6,084,547 and U.S. Pat. No. 5,915,449. A system for locating a mobile device on a railway line using beacons and/or GPS is described in WO99/56491 (and equivalents U.S. Pat. No. 6,456,825 and GB 2,336,972). A radio telephone system for use on an underground railway is described in WO 98/35511. A mobile telephone location process which uses timing advance to determine on which segment of a road the mobile phone lies is described in WO 96/39638 (and equivalents U.S. Pat. No. 6,459,954, EP 1 328 132 and EP 1 237 389) but this system is limited in its accuracy by, among other things, timing advance quantisation and divides the terrain covered into contours in which mobile data values, such as signal strength and timing advance, are expected to remain the same. This system therefore has a limited accuracy.

Background information relating to GSM location services can be found in technical specifications TS101527, and TS101530, TS101723 to 101726.

Many mobile phone network operators test their networks by means of so-called "drive" testing which, broadly speaking, involves collecting quality of service data from a mobile device as it is driven around within a region over which the network provides coverage. In a typical example of a "drive" test system a mobile phone is loaded with "drive" test software and connected via a serial cable to a portable computer which performs data logging and which is normally also used to control the mobile to calls to be established in regular pattern to test the network. Special instructions may be issued to the phone, for example to prevent handover to find the edge of a cell, or a mobile may be instructed to make repeated calls in an attempt to reproduce a fault. During these test calls the portable computer gathers diagnostic information from the phone and stores this for later analysis, this diagnostic information generally includes air interfaced messaging sent and received by the phone in normal operation, that is during call set-up, call clear-down, handover and the like. Typically a GPS receiver is also connected to the portable computer so that this diagnostic information can be indexed by location and, optionally subsequently mapped. Examples of "drive" test systems include the TEMS (Test Mobile System) GSM Investigation System from Ericsson and a range of devices from Agilent Technologies including the Nitro Drive Test equipment for GSM, GPRS and UMTS.

A system for evaluating a cellular communications network without the need for explicit "drive" testing, by making use of data collected from mobile phone users, is described in U.S. Pat. No. 6,266,514 (and equivalents WO 00/28755 and WO 00/28756), in which the position of a mobile phone is determined by triangulation from three of more base stations. Indoors a variant of "drive" testing, sometimes known as "walk" testing, is sometimes employed, in which rather than rely upon a GPS receiver (which may not be able to see enough satellites indoors) known marker points are determined and a user of the "drive" test system presses a button or the like to indicate when a marker has been reached and then walks in a straight line at a constant rate to the next predetermined marker location.

A particular problem arises when attempting to "drive" test a mobile phone onboard a train or other fast moving vehicle. It can be difficult to obtain a good GPS signal inside the train (or other vehicle) and the speed of motion makes it practically impossible for a user to indicate marker positions with sufficient accuracy. It is this and related problems which embodiments of the invention address.

At this point it is helpful to review some general features of mobile communications networks such as mobile phone networks. Embodiments of the invention will be described with specific reference to a GSM (Global System for Mobile Communications) network but applications of the invention are not limited to this type of network and related IS 136 networks and include other networks such as 2.5G and 3G networks such as GPRS (General Packet Radio Service) networks and third generation networks for example encompassed by the International Mobile Telecommunications IMT-2000 standard.

FIG. 1 shows a generic structure of a conventional wireless cellular mobile communications network such as a GSM-type mobile phone network. The network comprises a plurality of radio masts 102 serving a corresponding plurality of network cells 100. A base station (not shown in FIG. 1) comprising a plurality of rf transmitters and receivers is colocated with each mast 102 and each base station is connected to one of a plurality of base station controllers 104. In a GSM-type network the base station is referred to as a Base Transceiver Station (BTS). The base stations and masts 102 provide two-way radio communication with mobile stations such as mobile station 116 within the cells 100. This allows two-way transmission of voice and data traffic to and from a mobile station.

The radio link between a base station and a mobile station is primarily managed by a base station and its associated base station controller. Together these handle radio channel set-up, cell-to-cell hand-overs (in the USA referred to hand-offs) and other radio resource control functions. The radio link carries both traffic, such as speech and data traffic, and control information used to dynamically control transmit power, to allocate radio channels to mobile stations and for signalling functions such as paging a mobile station to alert it to an incoming call.

The network has a hierarchical structure in which a plurality of base station controllers 104 is connected to a Mobile services Switching Centre (MSC) 106 for routing calls between cells served by different base station controllers. The MSCs 106 are in turn connected to a gateway MSC (GMSC) 108, which is connected to the standard Public Switched Telephone Network PSTN 114. A home location register (HLR) 110 and Visitor Location Register (VLR) 112 manage call routing and mobile station roaming; other systems not shown in FIG. 1 provide functions such as security and authentication and billing.

The basic structure of FIG. 1 is employed in other mobile phone networks whether or not they are based on GSM, but the nomenclature may differ. For example in a 3G network a Base Transceiver Station is referred to as a Node B, and a Base Station Controller is referred to as a Radio Network Controller (RNC).

In FIG. 1 the cells 100 are shown schematically as a set of interlocking, non-overlapping coverage areas but in practice the coverage of neighbouring cells will tend to overlap, particularly at the edges. Interference between neighbouring cells is controlled by, among other things, controlling the base station transmission frequency and power and by using modelling programs to carefully site (and direct) the base station antennas. The coverage may have gaps where none of the local base stations provide sufficient signal for a mobile to operate adequately. Although in FIG. 1 the cells have been depicted as all being roughly the same size in practice cell size varies from dimensions of several kilometers diameter down to less than loom. Alongside railway lines, at least in rural areas away from towns, cells tend to be long and thin, the signal being beamed down the track.

FIG. 2a shows an example of a conventional drive test system 200. A mobile station 202 is connected to a base station 204, serving the cell in which the mobile station is located, across an air interface Um 206 in GSM/GPRS, Uu in UMTS (Universal Mobile Telecommunications System) networks. The base station 204 is coupled to a base station controller (not shown) and thence typically to a voice switch and optionally also to packet (data) switch. The mobile station is connected to a laptop computer 210, which is also coupled to a GPS receiver 212, which provides location data for the drive test system. In practice the mobile station 202 (and/or GPS receiver 212) may comprise a card within laptop 210. Messages captured from the mobile station, for example air interface messages, are stored as a time series in a log file in non-volatile storage such as a hard disk, illustrated by disk 208, for later analysis. A typical example of such a file 241 is shown, comprising a list of (traffic and/or signalling) messages logged by the mobile station and the time each message was logged.

FIG. 2b shows an example of the type of map 220 which can be generated using a conventional drive testing procedure. Geographical information, for example a road 234, is overlaid with results of individual measurements, such as measurements 236, and a desired and/or measured pattern of network cells, such as cells 222, 224, 226 and 228. Measurements 236 may be colour coded, for example to indicate signal strength. In the map of FIG. 2b region 232 indicates a hole in the network coverage where calls could be dropped. Region 230 indicates an area where overlapping coverage from two different cells operating at the same frequency could cause interference.

Returning to the problem of drive testing on board a train, one observation is that in general the speed of a train does not usually vary rapidly, there is an upper speed limit and so forth. Another observation is that some mobile communications networks in particular TDMA (Time Domain Multiple Access) networks such as GSM, make use of a so called timing-advance. In order to synchronise transmissions from mobile devices at different distances from a base station a timing advance is employed so that when the signals from the different mobile devices arrive at the base station they arrive within their designated time slot rather than overlapping the transmissions of other devices. A base station measures the timing delay, that is the time taken for a signal to propagate from a mobile device to a base station, and transmits a timing advance value (in a data packet) to the mobile device which then advances the timing of its transmissions accordingly so that after the propagation delay they arrive at the correct time. Further details of this timing advance signal can be found, for a GSM network, in ETSI (European Technical Standards Institute) standards GSM 05.05 (which describes radio transmission and reception), GS05.10 (which describes synchronisation), for example version 8.12.0 (and the related 3GPP TS 45.010, for example v.6.2.0), and GSM 04.08 (or ETSI 300 022; which describes, inter alia, radio resource management), the contents of all of which are hereby incorporated by reference in their entirety; the related IS 136 network standard is similar. For UMTS systems such as TD-CDMA, relevant standards are available from the Third Generation Partnership Project (3GPP, 3GPP2), detailed technical specifications for which can be found at www.3gpp.org and www.3gpp2.org.

In a GSM network the timing advance value is defined by a six bit data field and ranges from 0 to 63, one unit of timing advance corresponding to an RF propagation distance of approximately 550 m. Thus the granularity potentially offered by using timing advance of a measure of distance from a base station is also approximately 550 meters—this is, in effect, the separation between two successive timing advance contours. In a similar way to that described in WO 96/39638 referenced above this could be used in conjunction with the known layout of a railway to identify a segment of the railway within which a mobile device should be located. However, this lacks sufficient accuracy for useful "drive" testing. One could imagine defining a large number of approximate positions and then combining this information with known data or assumptions about motion of a train carrying a mobile device—for example assuming a constant velocity—and then employing some sort of best fit or simulated annealing (or max entropy) algorithm to determine a plausible, self-consistent set of phone locations but again this approach is less than satisfactory.

A desirable goal is to be able to identify a set of marker or reference positions at which the location of a mobile device is accurately known. These accurately defined reference points could then be used to determine intermediate locations of a mobile device.

With this in mind the applicant conducted a number of experiments on board a French TGV (Train a Grand Vitesse) train. FIG. 3 shows a schematic illustration of timing advance measurement data collected from a mobile station on a TGV when the train was outside an urban environment, showing timing advance against time on the horizontal axis. As can been seen, a pattern emerged comprising a repeated series of the same timing advance followed by a step change to the next permitted timing advance value; such a pattern is typically not seen in an urban or suburban environment.

The pattern of FIG. 3 can be understood by considering some of the requirements for cells used to provide network coverage for a railway line. Typically such cells tend to be long and thin with a base station beaming signals down the direction(s) of the railway line. By moreover because a train moves quickly it is generally desirable that handover boundaries are relatively crisp so that a handover decision can be made quickly and it is therefore preferable that there is just one obvious candidate for handover rather than several possibilities (as likely the case in an urban environment). Thus, at least in a rural environment, a network operator will attempt to position a base station providing coverage of a railway line so that there is largely line-of-sight to a mobile device on a train travelling along a line. Furthermore in a GSM network timing advance is preferably calculated using the first component of a signal transmitted from a mobile station to a base station to arrive at a base station with over a threshold level of power (rather than, for example, using the maximum power component), and this first-to-arrive component will correspond to a line-of-sight path.

As mentioned above, the granularity of a GSM timing advance signal is usually approximately 550 m except for some applications, for example in Africa, where this is doubled to provide a greater maximum cell size. This distance corresponds to a single bit change in the data value in the GSM timing advance field (see, for example, GSM 04.08, for example v.3.13.0 of February 1992, section 10.5.2.22; and GSM 04.04 version 8.1.1 sections 6 and 7 or ETSI TS 100 936), this representing a time difference of 3.70 µs (an 1100 m base-mobile-base station round trip). The six bit timing advance field allows data values of between 0 and 63 corresponding to timing advance times of 0 to 233 µs. In general the timing advance is rounded to the nearest bit period so that, for example, an incremental distance of up to 225 m results in no timing advance change (timing advance is zero for a mobile station to base station distance less than approximately 225 m)—although this may depend upon the network operator.

Referring again to FIG. 3, it has been recognised that certain points in the graph are special, in particular those beginning or ending a repeated sequence of timing advance values, for example timing advance values 304a, 306a of the three series 302, 304, 306 of timing advance values shown in FIG. 3. In general because the timing advance value is quantised the distance between a mobile station and base station has an uncertainty of 550 m but at one of these transition points this distance is known to be substantially equal to (timing advance−½)×550 m. The accuracy with which this precise transition point is known will depend upon the frequency of the timing advance measurements and upon the frequency with which these are logged—in practice timing advance measurements are provided more frequently than has been found necessary for an accurate position fix; in general terms, therefore, the aforementioned distance can be taken to be the distance at the end of one series of repeated timing advance values or at the beginning of the following sequence of timing advance values without significantly affecting the accuracy of the distance measurement. The timing advance value used in the aforementioned form of distance determination is that to which the timing advance value has just transitioned (increased or decreased)—if the previous timing advance is to be employed the formula is modified to (timing advance+½)×550 m. The skilled person will appreciate that in other networks where the timing advance is rounded differently the offset of ½ may be absent.

The inventors have recognized that the pattern shown in FIG. 3 may be used to provide exact position markers for a mobile station in a train travelling on a railway line, as well as in other similar scenarios. FIG. 4 shows the general principle in which the base station 400 beams signals towards a railway line 402. A first band 404a of distances from base station 400 correspond to a timing advance of, say, two and a second band 404b of distances from base station 400 correspond to a timing advance of three and line 406 between these two bands corresponds, in effect, to a timing advance of exactly 2.5. This intersects with railway 402, in this example, at two positions X and Y. Where this is the case either the results may be discarded as ambiguous or one of the positions may be selected based upon some a priori knowledge of a train's usual movement, for example by presuming that a train is not allowed to move backwards, or by presuming that the train has a maximum speed and/or that a speed of the train is not expected to change by more than a predetermined threshold.

Thus according to a first aspect of the present invention there is provided a method of locating a mobile communications device, the mobile device communicating with a mobile communications network infrastructure including a plurality of base stations, communications between the mobile device and a base station to which it is attached having a timing advance to compensate for a time taken for a radio signal to reach the base station from the mobile device, the method comprising: reading a time ordered sequence of messages captured from said communications between the mobile device and said network infrastructure; reading timing advance information from said captured messages; identifying a step change in timing advance using said timing advance information; and determining a location of said mobile device at a time of said step change.

In embodiments the timing advance information is quantised, for example taking on discrete values determined by an n bit binary data field, and identifying a step change comprises identifying a pattern comprising first and second sets repeated quantised timing advance values differing (increasing or decreasing) by a single timing advance quantum or binary digit. To identify a base station with which a mobile is communicating cell or base station identification data may be read from the captured messages, although timing advance data and cell/base station identification data are not normally found within a single message (alternatively a base station may be identified by an approximate, assumed mobile device position). In particularly preferred embodiments of the method the location of the mobile device on a known path is determined. Location information, for example latitude and longitude, for the base station serving the device may then be retrieved, for example from a database, and a location of the mobile device determined by determining an intersection of the known path with a line having a position determined by the identified base station location, in particular an arc, centred on the base station, and having a radius determined by a timing advance at the time of the step change. Preferably either immediately before or after the step. A plurality of such intersections may be determined and then one selected, for example based upon a direction(s) identified base station is pointing and/or based upon a priori knowledge of one or more motion constraints of the mobile device. Such motion constraints may comprise one or more of a direction motion, a maximum speed of motion, and a maximum acceleration and/or deceleration. In embodiments the motion is constrained to be in a forwards direction, the speed constrained to be not greater than a predetermined limit, and the acceleration (including deceleration) may also be required to be less than a threshold limit.

The above described methods can be employed to determine a plurality of marker positions on the known path and then intermediate locations of the mobile device on the path can be determined by (curvilinear) interpolation between these marker positions. Preferably the mobile communications network comprises a Time Domain Multiple Access (TDMA) such as a GSM or GPRS network or UTRAN (Universal Terrestrial Radio Access Network) with, say, TDD (Time Domain Duplex) and assessible timing advance data In embodiments of the method the known path comprises a railway line, in particular an overground railway.

In a related aspect the invention provides a method a method of providing location data for one or more messages of a stream of messages captured from a mobile communications network, the messages comprising messages sent between a mobile communications device and a base station of the network whilst said mobile device was moving on a known path, at least some of the said messages including timing offset information specifying a timing offset relating to a propagation time of a said message between the mobile communications device and said base station, said timing offset information being quantised, the method comprising: reading said timing offset information from said captured stream of messages; identifying a pattern in said timing offset information comprising a first and second series of substantially constant timing offsets separated by a step change in timing offset; determining a reference timing offset associated with said step change; determining at least one intersection of said known path with an arc centred on a location of a base station to which the mobile device is attached at a time of said step change and having a radius determined by said reference timing offset, to establish a reference point; and providing said location data for said one or more messages using said reference point.

In embodiments, as previously mentioned, the reference timing offset may be associated with the first or the second series of substantially constant timing offsets. The base station location may be read from a database of cell-information, which may also include other base station—related information such as a direction of one or more antennas, one or more beam widths, a serving frequency and the like. As previously mentioned a base station serving the mobile device may be identified from messages of the captured stream (generally different messages from those including timing advance information) or in some other way. Preferably a plurality of reference points is determined and stored in association with the captured messages, for example in a common time series data store. Messages of the captured stream between those associated with reference points may also be provided with location information by interpolation between the reference points; preferably this information is also stored in association with the messages.

The determining of at least one intersection may include limiting a position of the intersection using beam width and/or beam direction data for the base station. A plurality of intersections may be determined and one selected based upon rules relating to expected motion of the mobile device. Where an unambiguous determination of an intersection point is not possible that intersection may be discarded as a reference.

In the above described methods the messages comprising timing advance information may be captured at the mobile device end of the radio (air) interface or they may be captured at some point within the network infrastructure. This may be at a relatively low level, for example an area level protocol trace, to capture data from a base station controller interface, or drive test information may be captured at a higher level within the network infrastructure. In this latter case measurement data together with timing advance and/or determined mobile device location data may be sent through the network, for example from the mobile device end, and then pulled out as a thread of messages including all the desired information from an interface within the network infrastructure. Further details of methods and apparatus to implement such a system are described in the applicant's co-pending international patent application WO 03/047280, the contents of which are hereby incorporated in their entirety by their reference. Techniques for identifying a communications thread associated with a mobile device in a UMTS network are described in the applicant's UK Patent Application No. 0322979.6 filed 1 Oct. 2003, the contents of which are hereby incorporated by reference in their entirety.

The invention also provides computer program code to, when running, implement the above described methods. This computer program code may be provided on any conventional data carrier including, but not limited to, a disk, CD-ROM, programmed memory such as read-only memory (firmware), or on an optical or electrical signal carrier, for example for remote download. This code may be written in any conventional programming language including, but not limited to, a high level language such as C++, or a lower level language such as Assembly language.

The invention also provides a computer system for locating a mobile communications device, the mobile device communication with a mobile communications network infrastucture including a plurality of base stations, communications between the mobile device and a base station to which it is attached having a timing advance to compensate for a time taken for a radio signal to reach the base station from the mobile device, the computer system comprising: an input for captured message data; a data store for storing said message data, timing advance data, and location data; program memory storing processor implementable instructions; and a processor coupled to said data memory and to said program memory for loading and implementing said instructions, said instructions comprising instructions for controlling the processor to read a time ordered sequence of messages captured from said communications between the mobile device and said network infrastructure; read timing advance information from said captured messages; identify a step change in timing advance using said timing advance information; and determine a location of said mobile device at a time of said step change.

In another aspect the invention also provides a computer system for a method of providing location data for one or more messages of a stream of messages captured from a mobile communications network, the messages comprising messages sent between a mobile communications device and a base station of the network whilst said mobile device was moving on a known path, at least some of the said messages including timing offset information specifying a timing offset relating to a propagation time of a said message between the mobile communications device and said base station, said timing offset information being quantised, the computer system comprising: an input for captured message data; a data store for storing said message data, timing advance data, and location data; program memory storing processor implementable instructions; and a processor coupled to said data memory and to said program memory for loading and implementing said instructions, said instructions comprising instructions for controlling the processor to: read said timing offset information from said captured stream of messages; identify a pattern in said timing offset information comprising a first and second series of substantially constant timing offsets separated by a step change in timing offset; determine a reference timing offset associated with said step change; determine at least one intersection of said known path with an arc centred on a location of a base station to which the mobile device is attached at a time of said step change and having a radius determined by said reference timing offset, to establish a reference point; and provide said location data for said one or more messages using said reference point.

Preferably the above described computer systems also store instructions to write location data back to the data store in association with the message data so that a message is retrievable in association with location data for the mobile station at the time when the message was sent/received. The message and location data store preferably comprises a time series database, for example a data pipe comprising storage for a sequence of message each message having storage for a super-set of parameters of all the messages to which later access is required, the parameters including time and/or location. Embodiments of such a data store is described in more detail in the applicant's co-pending PCT application PCT/GB2004/000262 filed 27 Jan. 2004, the contents of which are hereby incorporated by reference in their entirety.

In the above described methods, computer program code and computer systems, and in the description which follows, use of terminology such as "base station" and "mobile station" which may happen to overlap with terminology employed in certain mobile communications network specifications does not imply restriction to any particular mobile communication network.

These and other aspects of the present invention will now be further described, by way of example only, with reference to the accompanying figures in which.

Figure 5A:
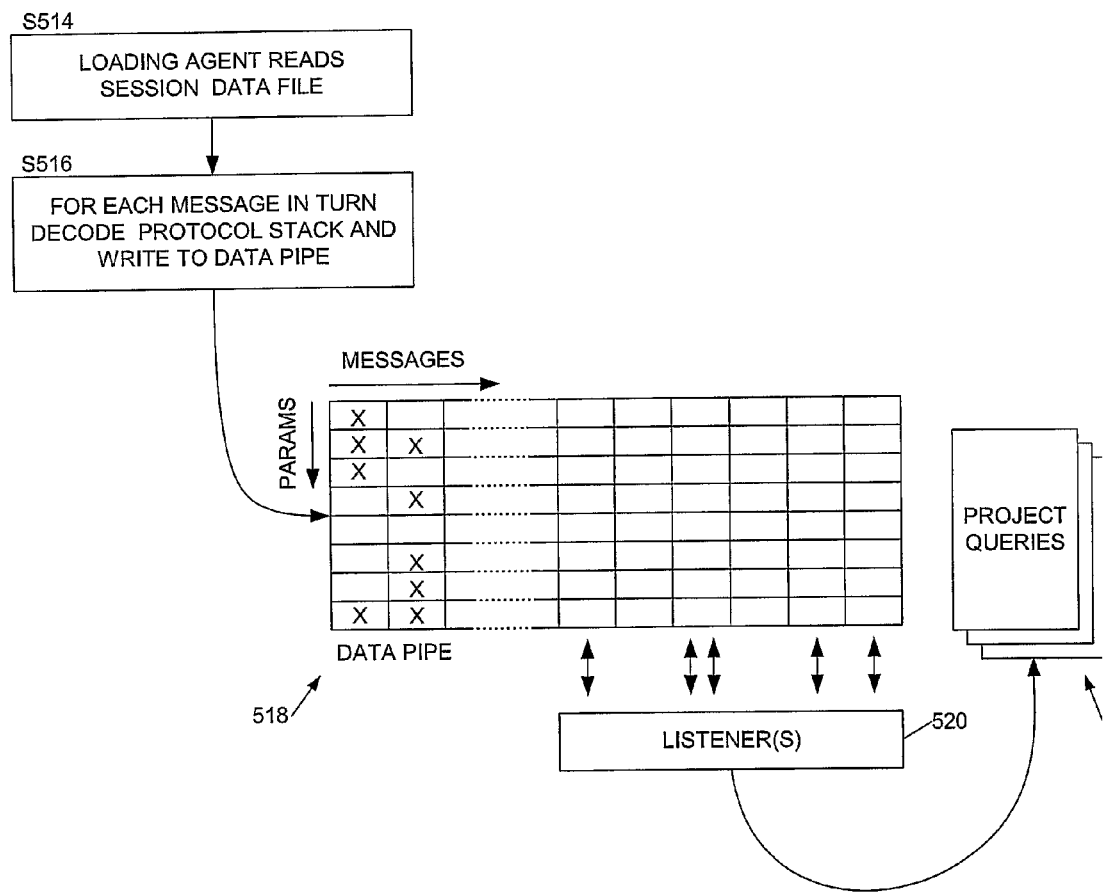
FIGS. 5a and 5b show, respectively, a message data file processing system, and a flow diagram of a procedure for providing mobile device position data for captured messages of a stream associated with the mobile device.

Referring now to FIG. 5a, this illustrates one example of a software system within which embodiments of a location method according to the invention can operate.

Initially messages of a mobile communications network such as a GSM, GPRS or UMTS network are captured and stored in one or more log files, in particular messages including radio parameters such as air interface messaging. Any conventional equipment may be employed, for example the Nitro (trade mark) drive test equipment available from Agilent Technologies, Inc. Then at step S514 a loading agent (software module) reads the log file(s) and for each message in turn (S516) decodes the protocol stack, to read traffic and/or signalling parameters therein. This may be performed in a conventional manner, for example using relevant published specification(s) such as the aforementioned specifications for GSM systems. Depending upon the drive test equipment employed some or all of the protocol stack decoding may already be performed prior to data being written into a log file.

The decoded parameters are written into a data pipe 518 comprising a time-ordered sequence of message stores, each message store having storage locations for a plurality of parameters. The plurality of parameters preferably comprises all those parameters which may be encountered in a captured message together with additional parameters which may be determined by listener functions (as described below) and written into the data pipe.

One or more listeners 520 may be attached to the data pipe 518 to determine additional parameters, in particular base station location and mobile device location for each message or a selection of the messages. This data may then be written back into the data pipe. Higher level functions may utilise the results from one or more lower level functions (attached at an earlier point on the data pipe); listeners may therefore define a tree structure. In embodiments a standard set of listeners is provided determining some commonly used analytical data; there may be provision for further, user-definable listeners. Higher level listener functions requiring previously determined results are attached at a later position in the data pipe than the listener functions determining the results upon which they rely. Data provided by a set of statistics may a define project query 522; in general, there may be a plurality of such queries.

More details of such a system are described in the applicant's co-pending international patent application No. PCT/GB2004/000262 entitled "Mobile Communications Network Monitoring Systems".

Typically a graphical user interface (GUI) is provided for visualisation and analysis of collected data, typically providing a map view allowing geographical visualisation of network performance parameters together with a variety of other data used. This is relevant to the identification of a mobile device location and association of the location with a message and the parameters it contains since, in general, messages are much more frequent than can easily be represented on such a map view. For this reason it is not normally necessary to determine a location for each captured message but merely at message number or time intervals, such as once or twice per second (the latter corresponding to a positional accuracy of approximately 40 m at TGV speeds of 300 km/hr). Intervening messages may then be given the same location. Some of the parameters which may be mapped include GSM RxLev-Sub and RxQualSub.

Figure 1:
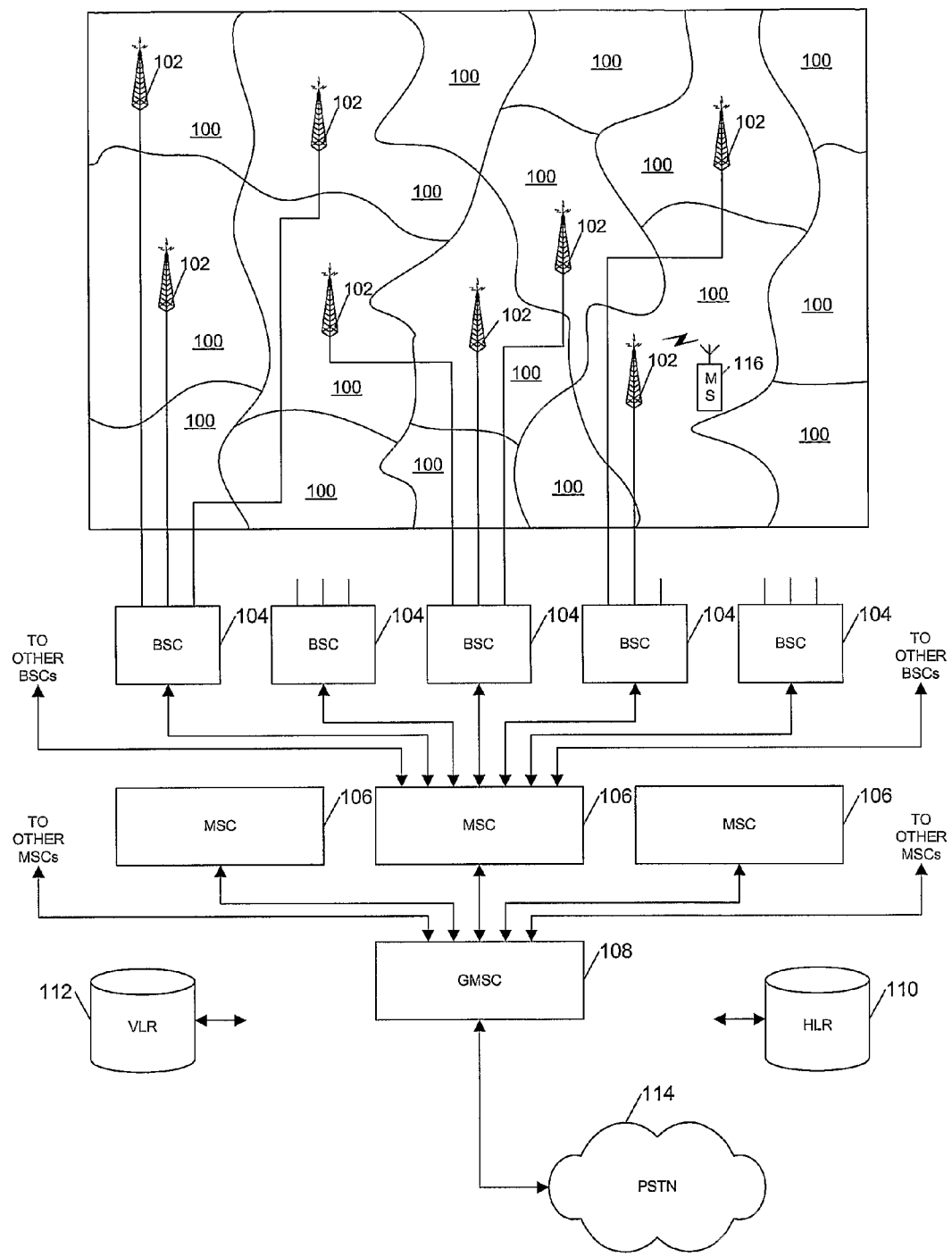
FIG. 1 shows a generic structure of a conventional wireless cellular communications network.
Figure 2A:
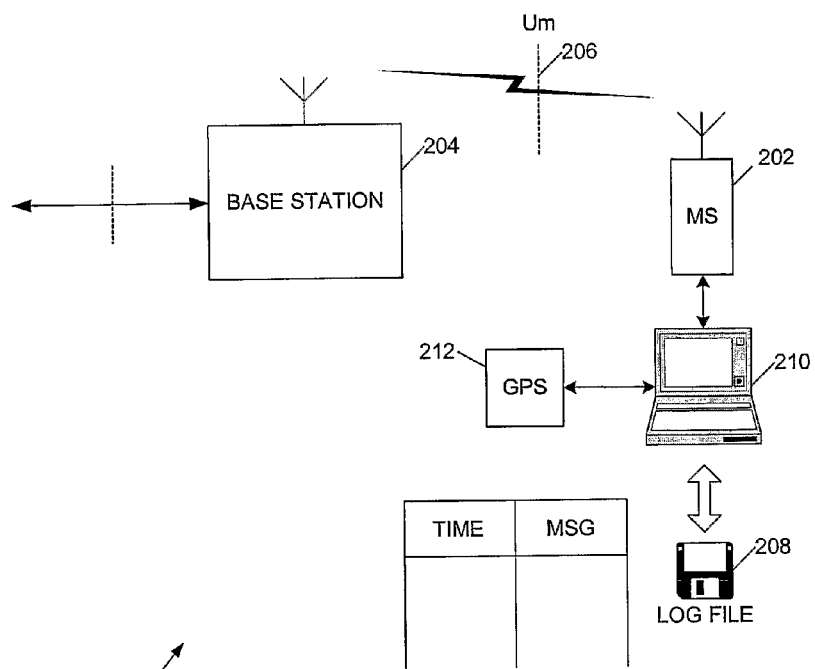
FIGS. 2a and 2b show, respectively, a conventional mobile communications network "drive" test system, and an example of a map generated by "drive" testing.
Figure 2B:
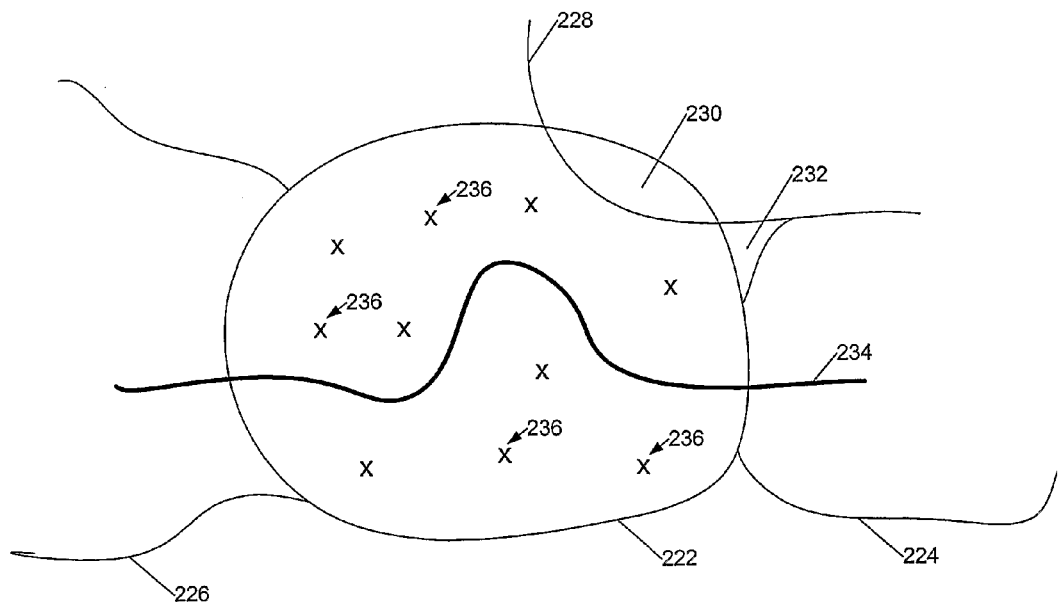
Figure 5B:
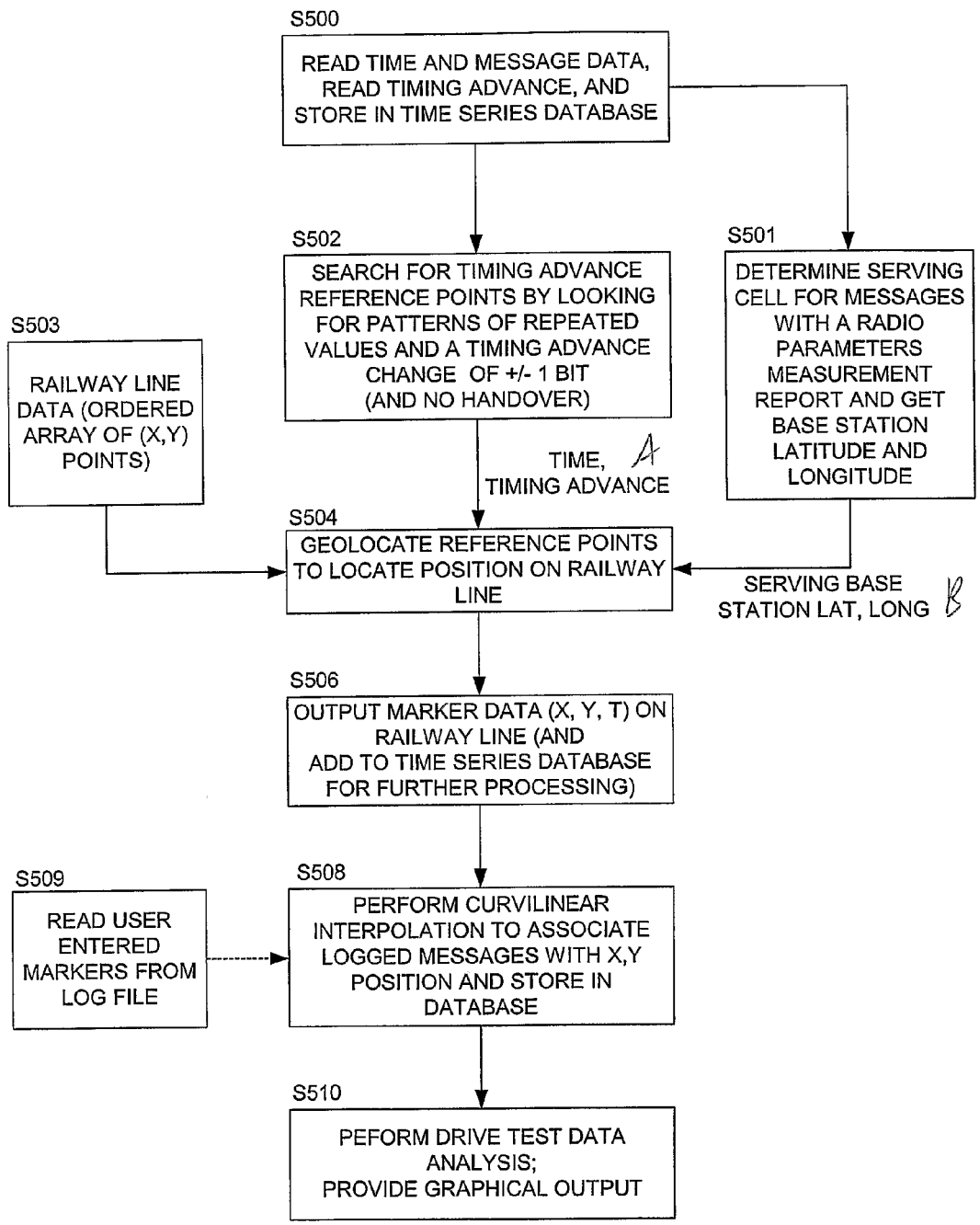

Referring now to FIG. 5b, this shows a flow diagram giving an overview of a procedure which may be used to determine locations for messages captured in a log file, such as log file 208 of FIG. 2a, from a mobile device travelling at high speed, for example on board a train, moving through a mainly rural environment.

At step S500 the procedure reads time and message data from the log file, reads timing advance information where present, and stores this in a time series database such as datapipe 518 of FIG. 5a. Depending upon the format of the log file and the implementation of the software this initial step may have already been performed elsewhere. In conjunction with determining the timing advance information the procedure, at step S501, also determines serving cell information from those messages with appropriate radio parameters (which will not in general be the same messages as those providing timing advance information). In particular a serving cell identifier (unique for a cell in a particular network) is read and used to determine latitude and longitude of a serving base station.

Figure 3:
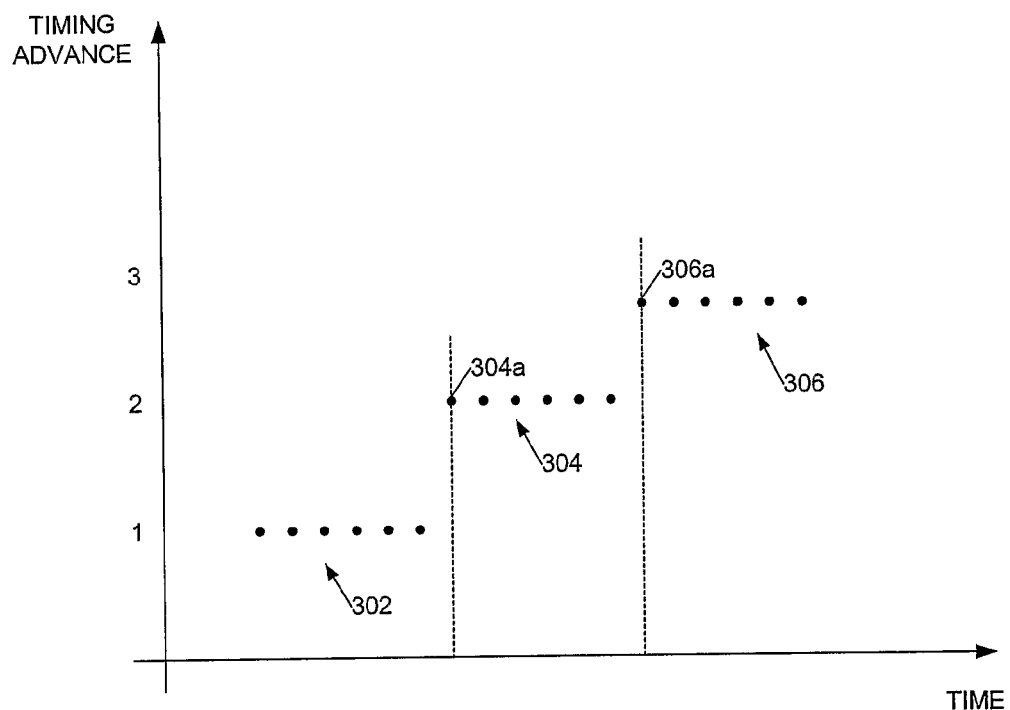
FIG. 3 shows schematically, a graph of timing advance against time for a mobile communications device moving on a high-speed train in a typical rural environment.

At step S502 the procedure then searches for timing advance reference points, also referred to herein as anchor points, such as points 304a, 306a in FIG. 3. These points are identified by searching for patterns of repeated dining advance values separated by a timing advance change of plus or minus one bit, without there having been a set handover (termed handoff in USA). The presence of a handover can be identified by a corresponding message within the captured stream.

Once a timing advance anchor or reference point has been identified this is used, at step S504, in conjunction with the serving base station latitude and longitude to locate a corresponding reference position, also termed herein a marker, on the railway line. Data defining the position of the railway line is provided (S503) to this geo location step as an array of X, Y (or latitude, longitude) at points, in a convenient representation defining a polyline, that is a continuous line formed from one or more connected line segments, specified by the segment end points.

Step S504 results in marker data, each marker specifying a position in two dimensions and time (X, Y, T) on the railway line. Each marker corresponds to a timing advance anchor points but, as will be seen below, not all timing advance anchor points necessarily result in a marker. This marker data is stored in association with the messages, for example as a parameter in datapipe 518, for further processing as desired.

In preferred embodiments of the procedure an additional step (S508) performs curvilinear interpolation along the direction of the railway line to provide an X, Y (or latitude, longitude) position for each captured message, for example as a parameter for each message in datapipe 518, to provide location data for each message. Thus step S508 interpolates between markers derived from timing advance anchor points and, optionally, also between any user-entered markers which may be present.

Once the message data has been processed to add location data for some or all of the messages "drive" test analysis may be performed in a conventional manner (step S510) along the lines outlined above.

Figure 6:
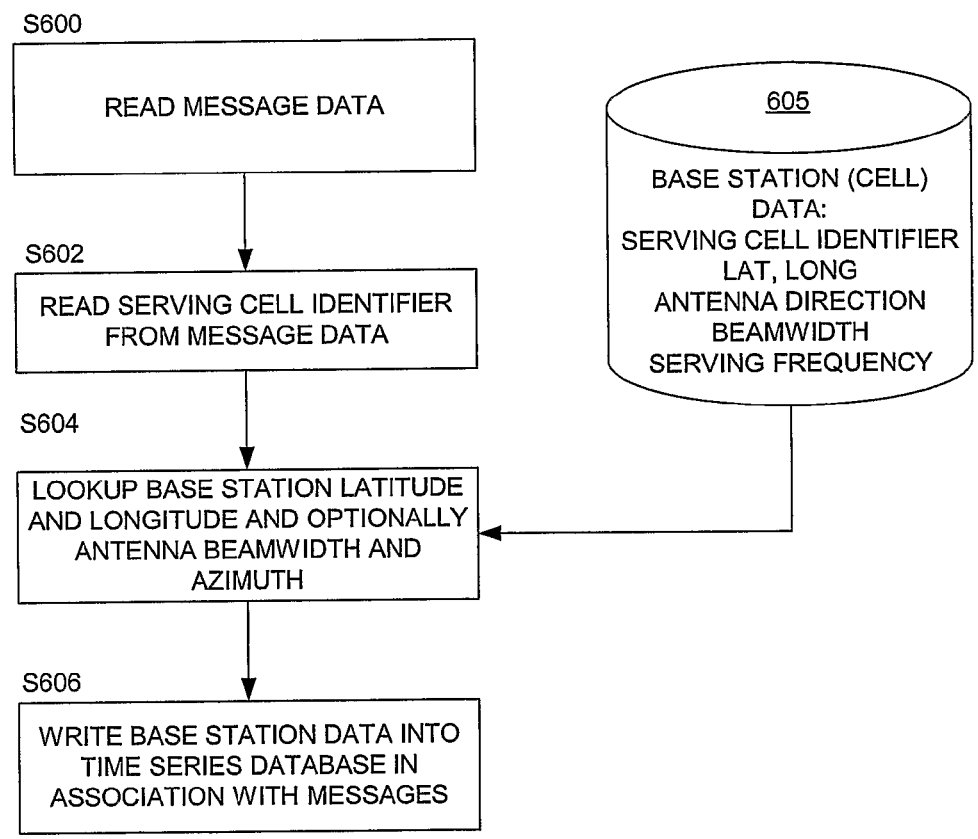
FIG. 6 shows a flow diagram of a procedure for determining serving cell data.

Referring next to FIG. 6, this shows a procedure for determining data relating to a serving cell for the mobile device. This may be implemented as one of listeners 520 in the system of FIG. 5a.

At step S600 the procedure reads the captured message data and extracts from this a serving cell identifier (S602) for example for a GSM network using a system information message (System information type 6—see, for example, GSM 04.08 section 9.1.34). Then, at step S604 the procedure accesses a database 605 of cell data to determine a base station latitude and longitude for the identified cell and, optionally, an antenna direction (Azimuth) and/or beam width. The cell data in database 605 preferably includes, as well as a serving cell identifier, base station latitude and longitude data, antenna direction and beam width data and serving cell frequency.

Once the base station location has been determined this is written back into the time series data store holding the messages (datapipe 518 in FIG. 5a) in association with the relevant messages. This operation may in practice comprise table join operation.

In above procedure once a serving cell has been identified for one message in the stream the same base station may be assumed to be serving the mobile device until a message with a new cell identifier is encountered. As previously mentioned location of a timing advance anchor point is unreliable at cell handover, and optionally such points can be labelled by identifying a handover command message. In the above procedure the use of antenna, beam width and direction information is optional as a cell identifier uniquely identifies a base station, but this information may be employed to assist in selecting an intersection point as described further below.

Figure 7:
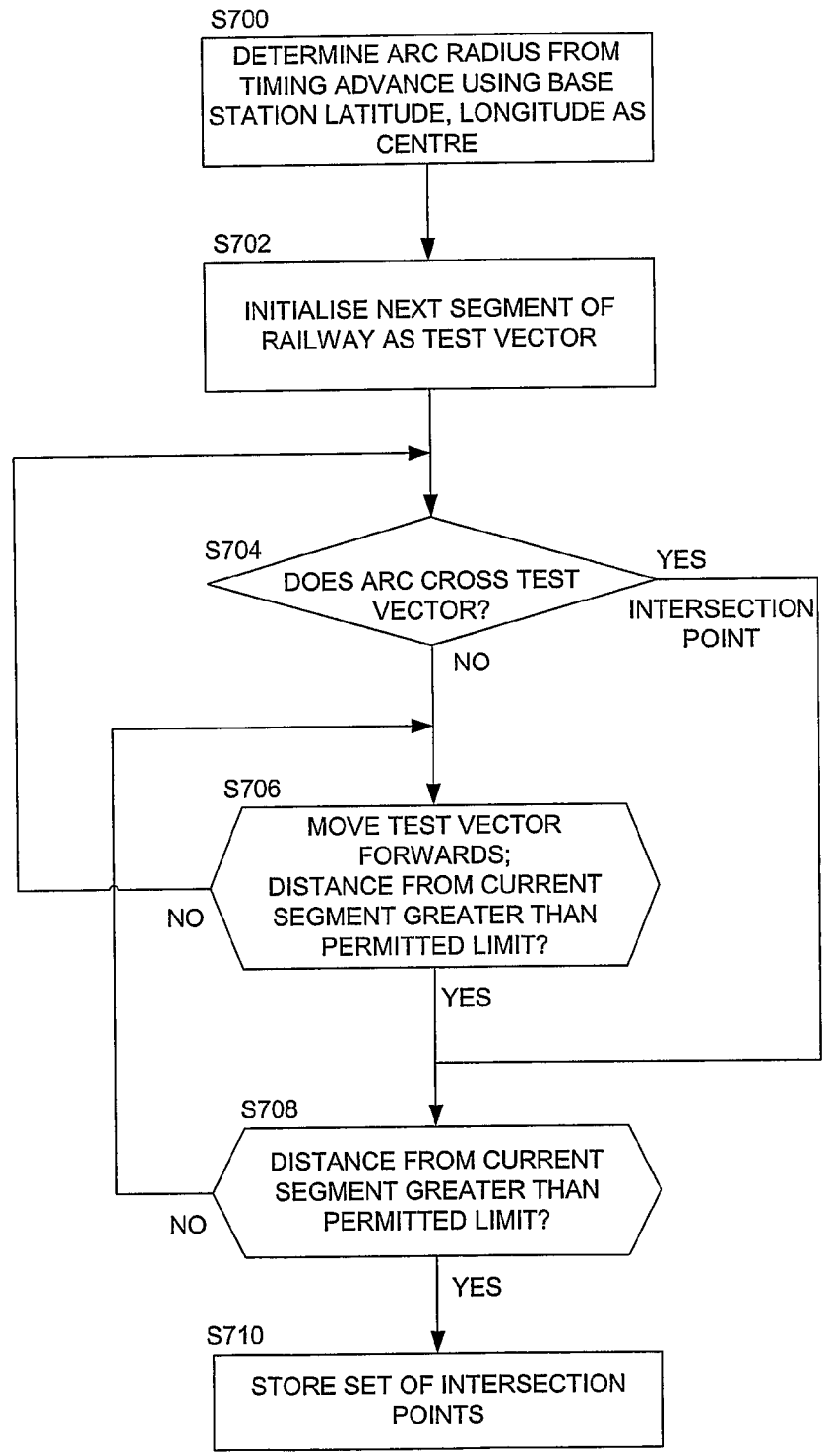
FIG. 7 shows a flow diagram of a procedure for determining potential reference point locations.

FIG. 7 shows details of the geo location step S504 of FIG. 5b. Thus once the base station latitude and longitude is known for the serving base station of the message, an arc is defined centred on this point and having a radius given by the timing advance at the relevant timing advance anchor point. The radius may be determined using (radius=(timing advance−0.5)/2×3×10$^8$) (S700), for a radius in meters for a network rounding the timing advance value to the nearest bit.

Figure 4:
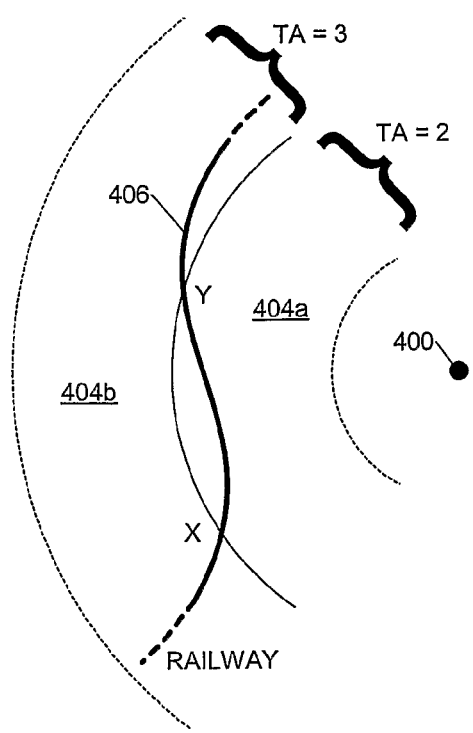
FIG. 4 shows, schematically, use of special timing advance points in the graph of FIG. 3 to determine marker or reference point locations on a known mobile communications device path.

Then the procedure chooses the next segment of the railway polyline as a test vector; here the "next" segment may comprise a first segment of the railway polyline (when the procedure is first operated), or a polyline segment which includes the current, latest marker, or the segment subsequent to that including the current common marker (S702). The procedure then checks, at S704, whether the arc defined in step S700 crosses the test vector, optionally at this stage filtering by antenna, beam width and direction. If the arc does cross the test vector then the procedure continues with step S708, and checks whether this crossing point is more than a predetermined distance from the current segment or marker, this distance being set preferably a little above a maximum expected velocity of the mobile device, i.e., of the train. If the intersection point is within the permitted distance limit the procedure loops back to step S704 to search for other intersection points (there may be several, as schematically shown in FIG. 4); if the intersection point is outside the permitted distance limit then, at step S710, the procedure stores the determined set of intersection points, which may comprise zero, one or more than one point. If no intersection point is found the timing advance anchor point is ignored and the procedure moves to the next anchor point.

If, at step 704, the arc does not cross the test vector then, at step S706, the procedure moves the test vector forwards and, providing that the vector has not moved beyond the permitted distance limit from the current segment, it loops back to step S704 to recheck whether the arc now crosses the test vector. The forward motion of the test vector at S706 provides a constraining assumption that the mobile device is moving only in a forward direction; the skilled person will understand that, if desired, this constraint could be removed.

Figures 8, 9:
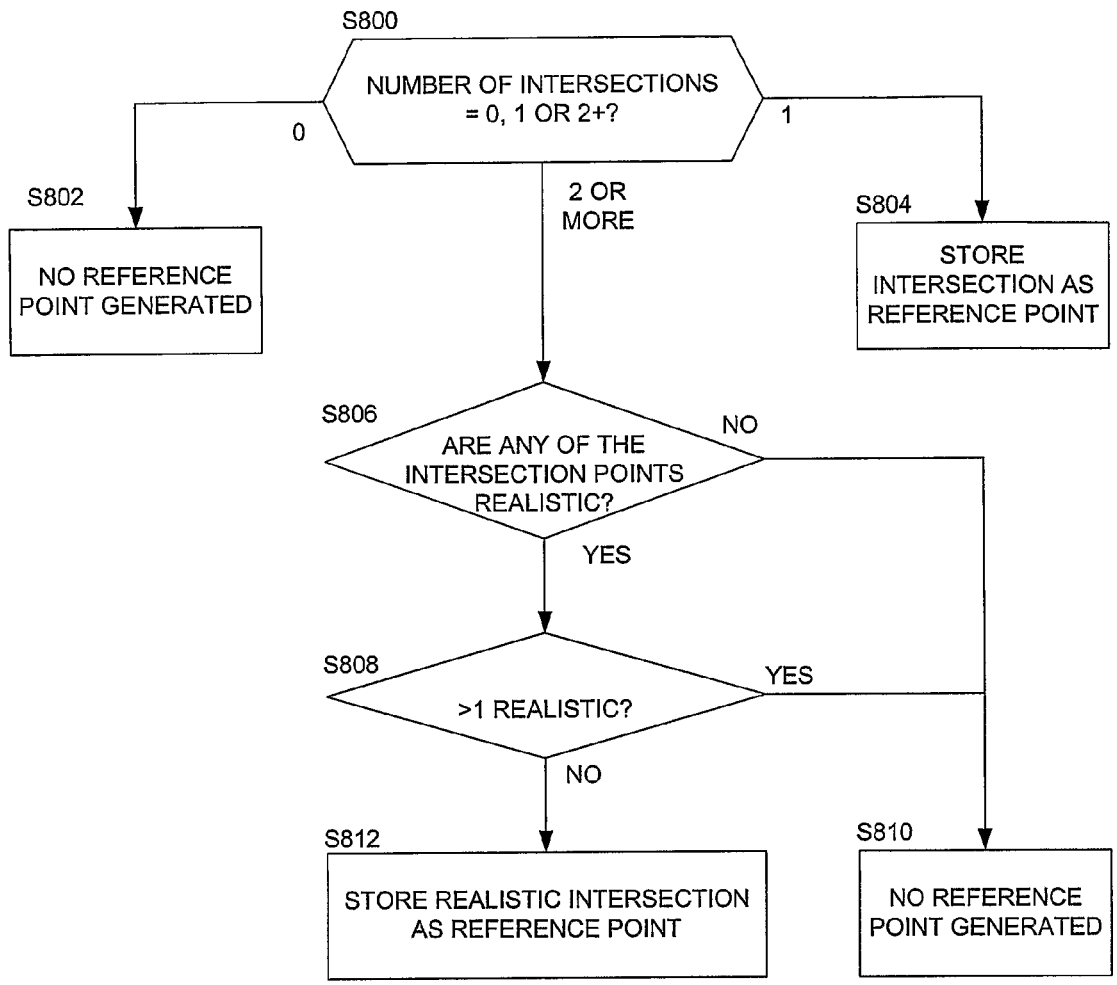
FIG. 8 shows a flow diagram of a procedure for selecting points for use as reference marker points.
FIG. 9 illustrates a curvilinear interpolation procedure.

FIG. 8 shows details of a switch procedure which may be applied to the list of potential intersection points resulting from the procedure of FIG. 7. Thus beginning at step S800, if no intersections have been found by the previous procedure then no reference (marker) point is generated, S802. If one intersection point has been identified then it is stored as a reference (marker) point, S804, unless some predetermined motion constraint is violated. An example of such a constraint is a maximum speed constraint, in which case the point is only stored as a reference or marker provided that the distance moved from the previous reference or marker point within the time between the two points is not more than is allowed by any permitted maximum speed.

Where two or more intersections have been determined by the procedure of FIG. 7, at step S806 a test is preferably made to determine whether any of the intersection points are realistic. This test preferably employs one or more motion constraints such as no backwards motion on the same polyline segment, no forwards motion at greater than a maximum speed, for a TGV approximately at 300 km/h and, if necessary, a maximum acceleration and/or deceleration constraint. If none of the intersection points are realistic then no reference point is generated (S810), otherwise a check (S808) is made to see whether there is more than one realistic intersection point and again, if so, no reference point is generated because of potential ambiguity. If just a single intersection point is realistic then this is stored as a reference (marker) point (S812). Since there are normally many anchor points the procedure can afford to take a robust approach, only using intersection points as reference points where there is a relatively high level of confidence that a point is correct.

FIG. 9 diagrammatically illustrates a curvilinear interpolation procedure along a portion of railway polyline between reference (marker) points A and B. The table shows a sequence of messages and corresponding times, and starting with a message at a time when the mobile device is at A and finishing with a time when the mobile device is at B, these messages having associated markers $P_A$ ($X_A$, $Y_A$, $T_A$) and $P_B$ ($X_B$, $Y_B$, $T_B$). Since the marker points are in general relatively closely spaced there is little loss of accuracy in assuming a constant speed v between points A and B, this speed being determined by a distance along the railway line between points A and B divided by ($T_B - T_A$). To determine intermediate positions for the messages between those associated with markers at A and B it is simply necessary to move along the railway line a distance determined by the speed v, for example for the second message in the table a distance $(T_2 - T_A)v$.

In embodiments where the mobile device is moving at a high speed there is no need to determine a separate position for each message and instead positions may be determined at time intervals of, for example, one second with little loss of accuracy. In the interpolation procedure the messages shown in FIG. 9 for which locations are determined may have a large number of intermediate messages and the procedure may retrieve the first message coming at least one second later than a message at the previously determined position when performing the interpolation.

Figure 10:
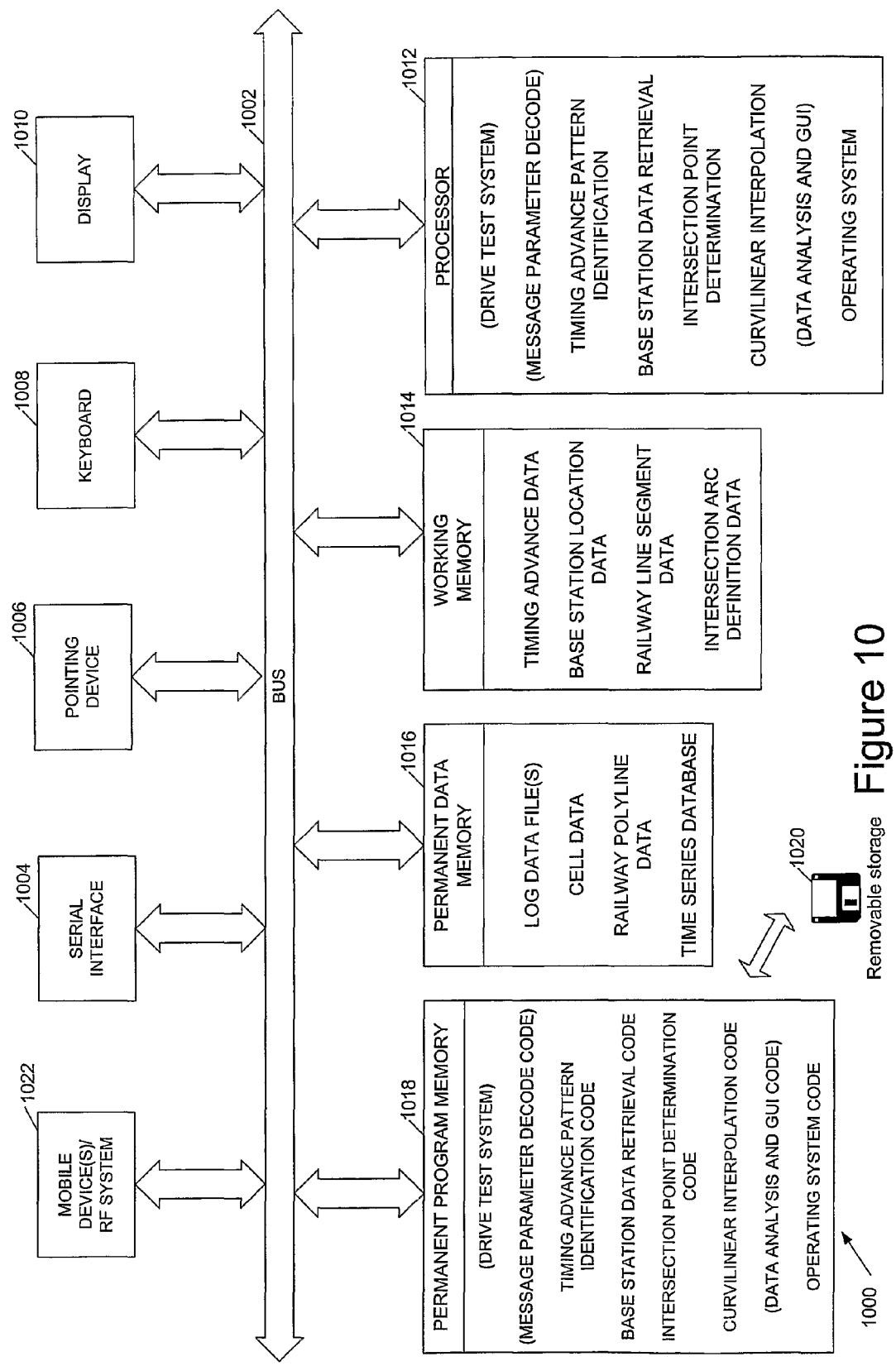
FIG. 10 shows a block diagram of a computer system programmed for implementing an embodiment of a location method according to an aspect of the present invention.

FIG. 10 shows a general purpose computer system such as a laptop computer programmed to implement embodiments of the above described procedures. The computer system 1000 comprises a data and address bus 1002 to which are connected one or more mobile devices 1022 and/or an RF Test System; alternatively a serial interface 1004 may be employed for connecting to a mobile device. As illustrated the computer system also includes a pointing device 1006 such as a mouse, a keyboard 1008, and a display 1010 although it will be appreciated that the addition of location information to logged messages does not in itself require a user interface and may be performed, for example, by a blade server.

Also coupled to bus 1002 is permanent program memory 1018 providing local data storage for program code for controlling the computer, permanent data memory 1016, working memory 1014, and a processor 1012 to load and implement the code in program memory 1018.

As illustrated the code in permanent program memory 1018 comprises timing advance pattern identification, base station data retrieval code, intersection point determination code, curvilinear interpolation code and operating system code. Optionally this memory may further include code for interfacing with or operating a "drive test" system, and depending upon the format of logged messages, message parameter decoding code; data analysis and graphical user interface code may also be stored. Permanent data memory 1016 stores the one or more files of logged message data, cell data as described above, railway polyline data, and also provides storage for message parameter, time and associated location data, preferably as a time series database, for example in the sparse format of datapipe 518 of FIG. 5a or in some more compact format. The working memory 1014 will, as described above, generally include timing advance data, base station location data, railway line segment data, and intersection arc definition data.

The processor 1012 runs the code in program memory 1018 to provide functions defined by this code.

The permanent program memory and permanent data memory will generally comprise non-volatile storage such as a hard disk; as the skilled person will understand, the stored code and/or data may be distributed between networked components. The code and/or data may also be provided on removable storage medium illustratively shown by disk 1020.

As previously mentioned, in general a large number of timing anchor points can be identified. In practice it has therefore been found that improved location performance can be achieved by robustly filtering these so that location determination is based upon points in which there is a high degree of confidence. There are various ways of providing such a "confidence filter". For example a signal quality measure may be employed to select anchor points or messages for use in determining anchor points; in a GSM system the 3-bit RxQual value (see GSM 05.05) may be employed. Additionally or alternatively a compensation or calibration may be applied to timing advance measurements made along a known path such as a railway line. Such a compensation or calibration may be determined by, for example, on one occasion providing a train running along a planned route with a GPS (Global Positioning System) system as well as with a system employing the techniques described herein, so that location measurements can be determined by both systems and compared. Such an approach has identified that there is a small lag in determining a location, depending upon whether a train is moving towards or away from the base station, for which a small compensation may be made, if desired.

Figure 11:
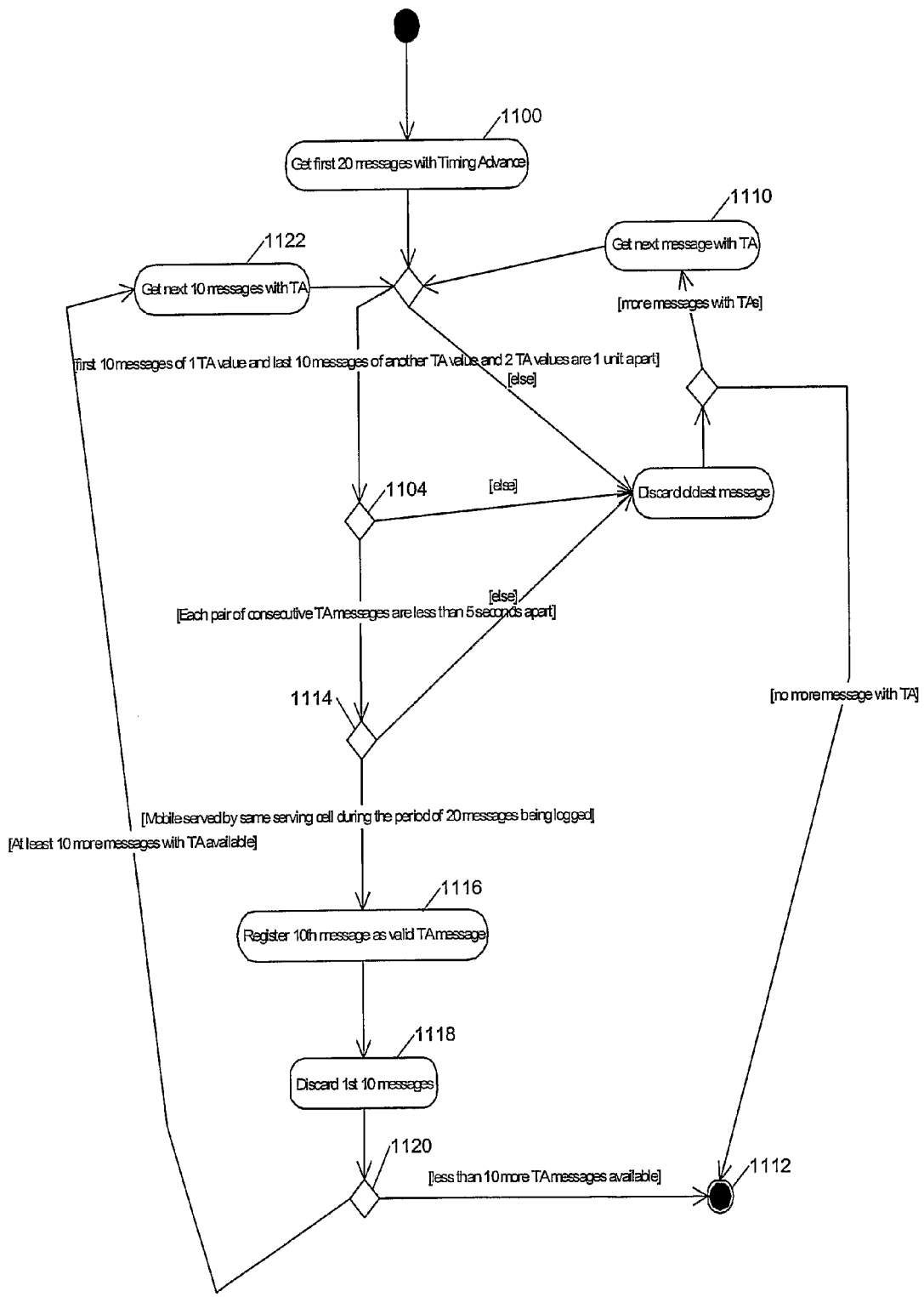
FIG. 11 shows a flow diagram of a procedure for identifying timing advance anchor or reference points.

Referring now to FIG. 11 this shows details of another, similar example of a procedure for identifying timing advance anchor points. In this example the criteria for a timing advance (TA) anchor point are as follows: The TA value is about to change by one; and there is a valid TA plateau both before and after the TA value change while the mobile is served by the same cell.

In this example the criteria for a valid TA plateau are as follows:

At least ten TA messages (this number may be modified according to the application); less than five seconds between consecutive TA messages (this also may be modified according to the application); and the mobile device is served by the same cell.

In the procedure of FIG. 11 a window of twenty messages with timing advance values are examined at a time, and whenever the tenth message in the window satisfies the foregoing criteria this is extracted as a valid TA value for use as an anchor point. Thus at step 1100 the procedure retrieves the first twenty messages with timing advance values and at step 1102 determines whether the first ten messages have a first TA value and the last messages have a second TA value, the first and second TA values being one unit apart, if so the procedure continuing to step 1104 and if not the procedure discarding the oldest message at step 1106. Following step 1106 the procedure checks at step 1108 whether there are any further messages with TA values, if so getting the next message (step 1110) and looping back to step 1102; if not the procedure ending at 1112. At step 1104 the procedure checks that each pair of consecutive TA messages are less than five seconds apart, if not discarding the oldest message 1106, if so proceeding to step 1114 to check that the mobile is served by the same serving cell during the period of twenty messages being reviewed. If there was a handover during these twenty messages the oldest message is again discarded 1106 but if not the tenth message is registered as a valid TA (anchor) message 1116. The first ten messages are then discarded 1118 and if less than ten more TA messages are available 1120 the procedure ends, otherwise getting the next ten messages with TA values 1122 and looping back to step 1102.

Figure 12:
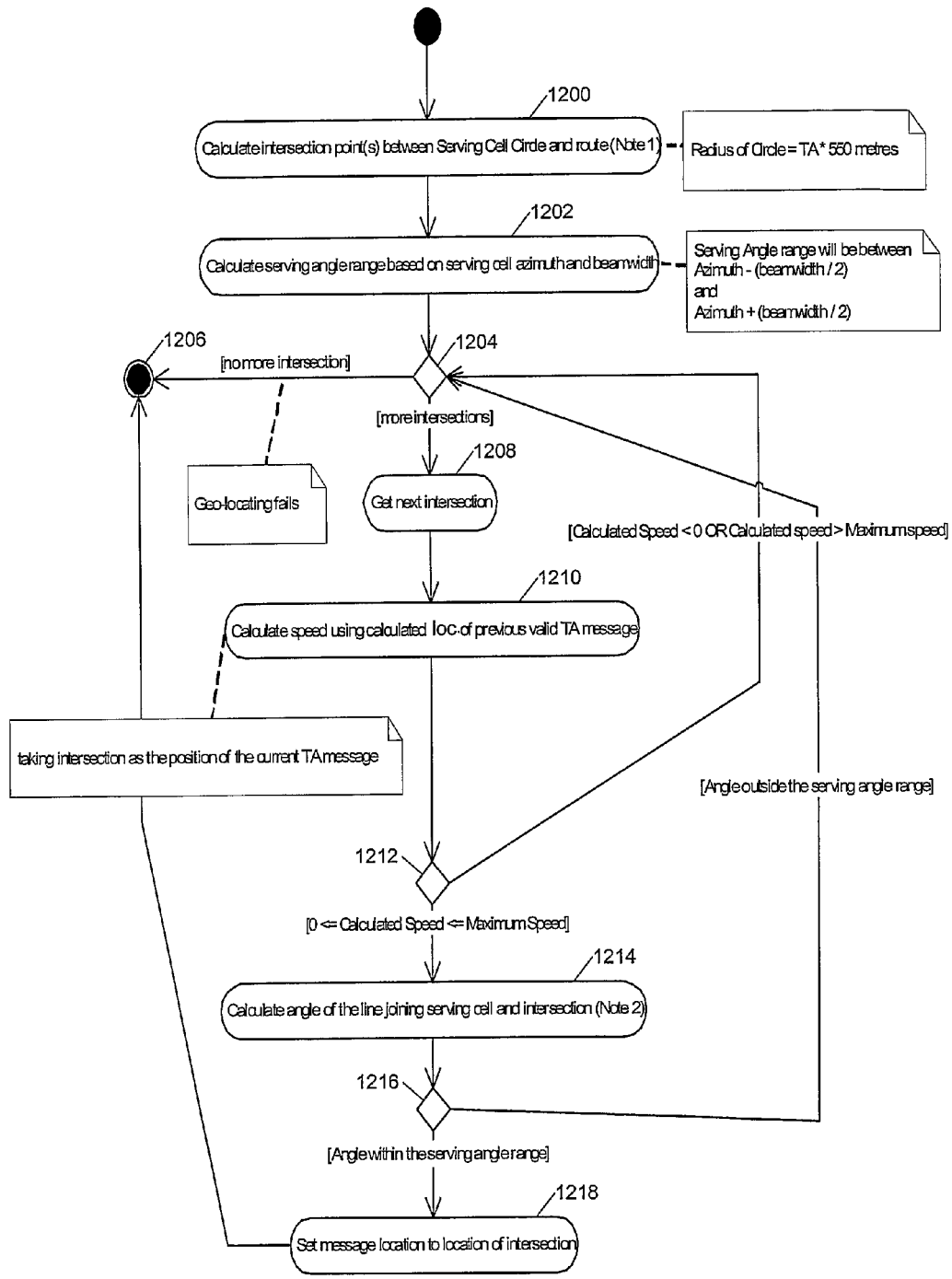
FIG. 12 shows a flow diagram of a first procedure for determining a location of a timing advance reference point.
Figure 13:
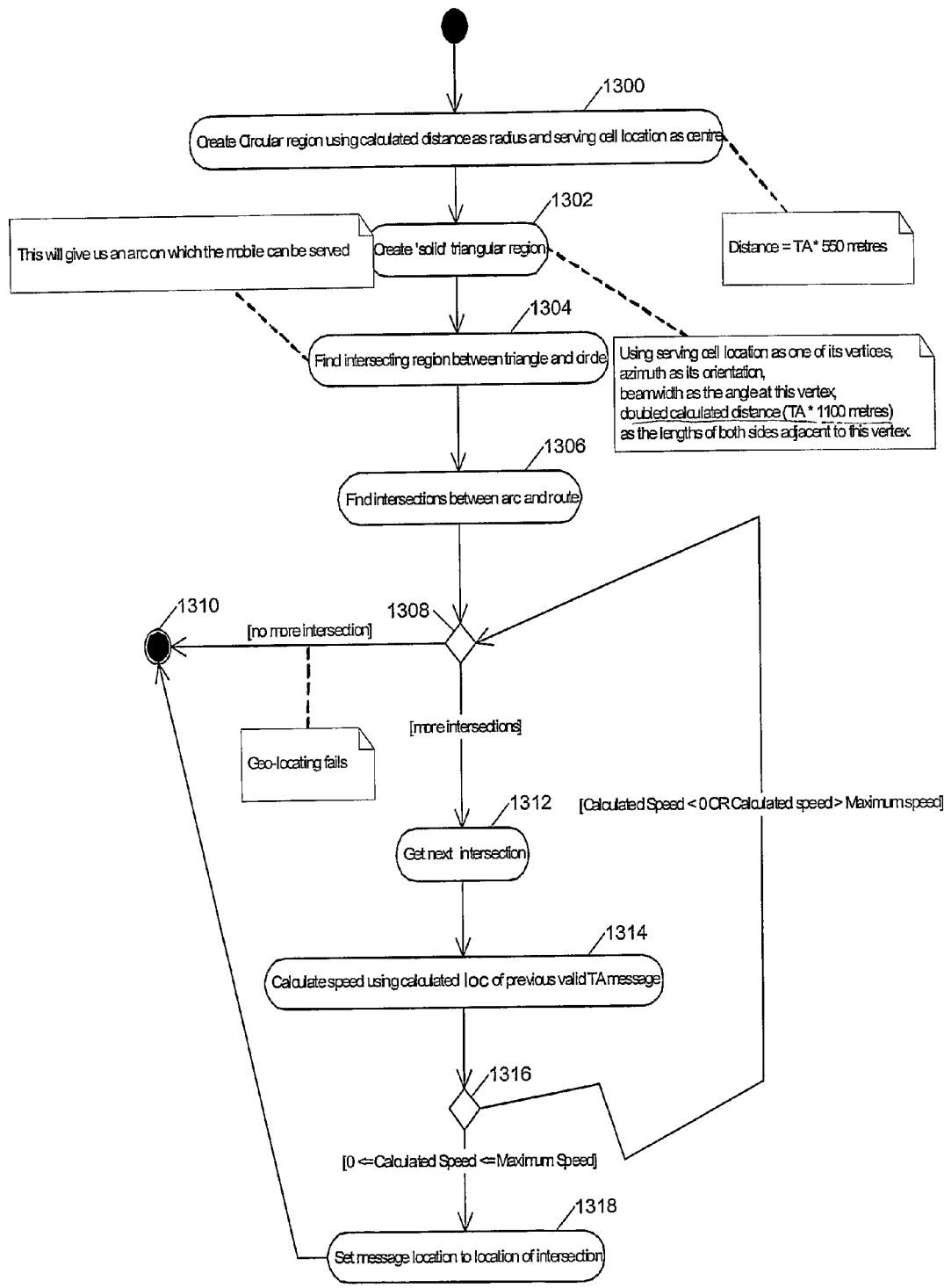
FIG. 13 shows a flow diagram of a second procedure for determining a location of a timing advance reference point.

FIG. 12 shows details of a first procedure for geo locating the timing advance anchor points, that is for determining a position on the railway track (or other known path) of a timing advance anchor point. A second alternative procedure is shown in FIG. 13. Both procedures are based upon determining intersection points between the route of the mobile device and an arc with a centre defined by the serving cell and radius defined by a distance between the mobile device and the serving cell base station based upon the timing advance anchor point value. The first procedure employs a geometric formula; the second employs API (Application Program Interface) calls to the well known MapX (registered trademark) software available from MapInfo (registered trademark).

Referring to FIG. 12, the procedure first calculates one or more intersection points in between the serving cell circle and the mobile device route 1200, the radius of the circle being determined by the (timing advance)×550 m. The intersection points may be determined as follows:

Preferably we use the parametric form of a line going through points (a1, a2) and (b1, b2), which are the nodes or extremities of a track segment. The form is:

$$x = a1 + t*(b1-a1)$$

$$y = a2 + t*(b2-a2)$$

If r is the distance resulting from the TA value we can replace x and y in the circle equation $(x-h)^2+(y-k)^2-r^2=0$ by the expressions $x=a1+t*(b1-a1)$ and $y=a2+t*(b2-a2)$ and then solve for t.

We will obtain zero, one, or two possible values of t. We can just consider the discriminant of the quadratic in the solution. If the discriminant is positive, there are two intersection points; if the discriminant is zero, just one (tangency); if the discriminant is negative, there is no intersection.

$$t=(2*a1^2+2*a2^2-2*a1*b1-2*a2*b2-2*a1*h+ 2*b1*h-2*a2*k+2*b2*k-\text{Sqrt}[(-2*a1^2- 2*a2^2+2*a1*b1+2*a2*b2+2*a1*h-2*b1*h+ 2*a2*k-2*b2*k)^2-4*(a1^2+a2^2-2*a1*b1+ b1^2-2*a2*b2+b2^2)*(a1^2+a2^2-2*a1*h+h^2- 2*a2*k+k^2-r^2)])/(2*(a1^2+a2^2-2*a1*b1+ b1^2-2*a2*b2+b2^2))\}$$

$$t=(2*a1^2+2*a2^2-2*a1*b1-2*a2*b2-2*a1*h+ 2*b1*h-2*a2*k+2*b2*k+\text{Sqrt}[(-2*a1^2- 2*a2^2+2*a1*b1+2*a2*b2+2*a1*h-2*b1*h+ 2*a2*k-2*b2*k)^2-4*(a1^2+a2^2-2*a1*b1+ b1^2-2*a2*b2+b2^2)*(a1^2+a2^2-2*a1*h+h^2- 2*a2*k+k^2-r^2)])/(2*(a1^2+a2^2-2*a1*b1+ b1^2-2*a2*b2+b2^2))\}$$

If there is a track segment where $0 \leq t \leq 1$ using the equations above, then we have found an intersection point.

In most cases, there is still another intersection to be found, so the algorithm should preferably move on to the next track segment, and only stop when two intersecting points (maximum) have been identified.

In order to speed up the search process, we store the previous estimated point position, and especially the index of the track it belongs to. Consequently, we disregard all track segments with a lower index, since the train is assumed to be moving forward only.

In a similar type of optimization, when going from one track segment to the next one looking for an intersecting point, one can keep track of the increasing distance (between the last interpolated point and the segment) during the process and stop the search if this distance becomes too high to be reasonable.

In embodiments the procedure then continues to calculate a serving angle range based upon serving cell azimuth and beamwidth 1202. The serving angle range is between: Azimuth−(beamwidth/2) and Azimuth+(beamwidth/2). The procedure then checks 1204 whether there are any more intersections, if not ending 1206 (the procedure failing is this is the first time around the loop); if so getting data for the next intersection 1208 and then determining the mobile device speed 1210 using the calculated location of the previous valid TA anchor message, taking the intersection as the position of the current TA message. The procedure then checks 1212 whether the calculated speed is between zero and a maximum speed, then if not looping back to step 1204, if so calculating 1214 an angle of a line joining the serving cell base station and intersection point. In order to find this angle 'theta' related to the segment going from the serving cell to a intersection point, we use the following algorithm:

```
if x > 0 then theta = arctan(y/x)
if x < 0 then theta = arctan(y/x) − 180 degrees
if x = 0 then
    if y > 0 then theta = 90 degrees
    if y < 0 then theta = 270 degrees
    if y = 0 then theta is indeterminate
``` where x=a−h and y=b−k, with (h, k) and (a, b) being the coordinates respectively of the serving cell and the intersection point.

Due to certain angular subtleties, it is preferable to add the following extra steps if the angle theta does not fit the coverage range of the serving cell, as estimated from the cell data:

```
if theta < 0 then theta = theta + 360;
else if theta > 0 then theta = theta − 360;
Check again if the new theta value fits the estimated cell range
```

Having determined this angle the procedure then checks 1216 whether the angle is within the serving angle range for the cell, if it is not looping back to step 1204. if it is then setting the message location to the location of the intersection 1218, the procedure then ending 1206. It will be appreciated that steps 1214 and 1216 are only needed if a base station beamwidth and Azimuth filter is being applied.

Referring now to FIG. 13, this shows an alternative procedure using MapX (registered trademark), which is less preferred because it is slower.

Initially the procedure creates a circuit region 1300 using the calculated mobile device-base station distance as radius and the serving cell base station location as centre, the radius being TA value×550 m. The procedure then creates a "solid" triangular region 1302 using the serving cell base station location as one of its vertices, Azimuth as its orientation, beamwidth as the angle at this vertex, and double the calculated radius (TA×1100 m) as the lengths of both sides adjacent to this vertex. Next the procedure finds 1304 an intersecting region in between the triangle and the circle, this providing an arc on which the mobile can be served. The procedure then finds 1306 intersections between this arc and the mobile device route. The procedure then tests whether there are any (further) intersections at step 1308, if not ending 1310 (the geo locating failing if no intersection is found). If there are more intersections then the procedure retrieves 1312 the next intersection and calculates the speed of the mobile device 1314 and tests 1316 whether this is in permitted bounds, as described above with reference to FIG. 12, looping back to step 1308 if not. If the intersection is within permitted bounds the message location is set to the location of the intersection 1318 and the procedure ends.

We will now briefly outline further details of the curvilinear interpolation procedure.

Preferably a section of rail network comprising one or more tracks is represented by a collection of segments defining polylines, for example in Mapinfo tab format. A MapX API can be called to build each segment of the polyline using a list of nodes.

Based on the coordinates of a marker, to identify on which track segment it is located the following parametric definition of a segment may be employed:

$$x = a1 + t*(b1 - a1)$$

$$y = a2 + t*(b2 - a2).$$

where the segment goes through points (a1, a2) and (b1, b2), and t is between 0 and 1.

Using these equations, for example replacing (x, y) with latitude and longitude values for a marker, allows verification that a unique value of t (with $0 \leq t \leq 1$) exists.

Once two consecutive markers have been located on their respective segments a Polyline object may be created from the railway track data, and this allows MapX (trade mark) properties such as Length to be called to get the total distance between the two markers.

Knowing the time spent by the train between the first marker and the second one, we calculate the average speed on that portion of the tracks. It is also possible also, based on the previous speed estimate, to derive an average train acceleration during the time period, which may used for more sophisticated validation functions.

Once the average speed is known, we calculate the distance between a message and the marker preceding it using the message timestamp. With the distance information, we identify the track segment to which the message belongs. Finally, using the parametric definition of the segment, we calculate location coordinates for this message (by setting the value of t as a distance ratio) and set it for all the following messages within a 1-second period.

Optionally a location confidence attribute may be set for interpolated messages according to the distance between the two anchor points used in the interpolation, the larger the distance the lower the confidence in the interpolated position data the lesser the distance the higher the confidence. Lower and upper distance thresholds may be employed for a confidence measure, in embodiments 100 m and 1000 m. Thus any interpolated position data using anchor less than the lower limit (100 m) apart are given a high confidence, and interpolated position data using anchor points between the upper and lower distance thresholds (between 100 m and 1000 m) apart are given a low confidence.

Optionally interpolated location data using anchor points a distance greater than the uphold threshold (1000 m) apart maybe tagged to indicate no confidence.

Embodiments of the invention have been described with reference to applications in "drive testing" but the skilled person will appreciate that there are many other potential applications for the addition of location data to messages captured by a mobile communications network, either from a mobile device or from a portion of the fixed infrastructure. For example location data may be sent through the network, optionally with measurement data, and retrieved for use from an interface within the network infrastructure.

Applications of embodiments of the invention have been described with specific reference to high speed trains but the skilled person will appreciate similar techniques may be used for locating mobile devices on other vehicles including, but not limited to, buses, cars, trams, ships and aircraft. Although embodiments have been described with reference to overground railway lines, embodiments of the invention may also be applied underground. Although it has been observed that the timing advance pattern used to determine timing advance anchor points is most likely to be found outside urban areas methods embodying aspects of the invention may be employed whenever a characteristic timing advance pattern can be identified and need not be restricted to outside urban-areas, although embodiments of the foregoing methods are most likely to give useful results in semi-rural and rural environments for other situations where serving base stations tend to beam signals along railway or other tracks.

No doubt many other effective alternatives will occur to the skilled person. It will be understood that the invention is not limited to the described embodiments and encompasses modifications apparent to those skilled in the art lying in the spirit and scope of the claims appended hereto.

The invention claimed is:

1. A method of locating a mobile communications device on a known path, the mobile device communicating with a mobile communications network infrastructure including a plurality of base stations, communications between the mobile device and a base station to which it is attached having a timing advance to compensate for a time taken for a radio signal to reach the base station from the mobile device, the method comprising:

reading a time ordered sequence of messages captured from said communications between the mobile device and said network infrastructure;

reading timing advance information from said captured messages;

identifying a step change in timing advance using said timing advance information;

reading base station identification data from said captured messages, for identifying a base station to which the mobile device is attached at said time of said step change;

reading base station location data for said identified base station; and determining a location of said mobile device on said known path at a time of said step change by determining an intersection of said path with a line having a position determined by said identified base station location and said timing advance immediately before or after said step change.

2. A method as claimed in claim 1 wherein said timing advance information comprises quantised timing advance values, and wherein said step change identifying comprises identifying a pattern in said timing advance information, said pattern comprising a first set of repeated quantised timing advance values followed by a second set of repeated quantised timing advance values, said quantised timing advance values of said first and second sets differing by a single timing advance quantum.

3. A method as claimed in claim 1 wherein said location determining determines a plurality of said intersections, the method further comprising reading one or more of base station beamwidth and base station transmission or reception direction information for said identified base station, and selecting one or more of said intersections using said beamwidth and/or direction information.

4. A method as claimed in claim 1 wherein said location determining determines a plurality of said intersections, the method further comprising selecting one of said intersections using a priori knowledge of one or more motion constraints of the mobile device.

5. A method as claimed in claim 4 wherein said motion constraints comprise one or more of a direction of motion, a maximum speed of motion, and a maximum acceleration and/or deceleration.

6. A method as claimed in claim 1 comprising determining a sequential plurality of locations of said mobile device on said path.

7. A method as claimed in claim 6 further comprising interpolating between locations of said plurality of locations to determine intermediate locations of said mobile communications device.

8. A method as claimed in claim 1 wherein said known path comprises a railway line.

9. A method as claimed in claim 1 wherein said mobile communications network comprises a Time Domain Multiple Access (TDMA) Network.

10. A method as claimed in claim 1 wherein said mobile communications network comprises a Global System for Mobile Communications (GSM) Network.

11. A method of providing location data for one or more messages of a stream of messages captured from a mobile communications network, the messages comprising messages sent between a mobile communications device and a base station of the network whilst said mobile device was moving on a known path, at least some of the said messages including timing offset information specifying a timing offset relating to a propagation time of a said message between the mobile communications device and said base station, said timing offset information being quantised, the method comprising:
    reading said timing offset information from said captured stream of messages;
    identifying a pattern in said timing offset information comprising a first and second series of substantially constant timing offsets separated by a step change in timing offset;
    determining a reference timing offset associated with said step change;
    determining at least one intersection of said known path with an arc centred on a location of a base station to which the mobile device is attached at a time of said step change and having a radius determined by said reference timing offset, to establish a reference point; and
    providing said location data for said one or more messages using said reference point.

12. A method as claimed in claim 11 further comprising determining a plurality of said reference points; and storing reference point data for said reference points in association with said captured messages.

13. A method as claimed in claim 12 further comprising interpolating between said reference points along said known path to provide said location data for said messages.

14. A method as claimed in claim 11 wherein said determining of said at least one intersection includes limiting a position of a said intersection using beamwidth and/or beam direction data for said base station.

15. A method as claimed in claim 11 further comprising determining a plurality of said intersections, and selecting a said intersection for establishing said reference point using one or more rules relating to an expected motion of said mobile device.

16. A method as claimed in claim 11 further comprising reading a said message to identify said base station to which the mobile device is attached at a time of said step change.

17. A method as claimed in claim 11 wherein said mobile communications network comprises a Time Domain Multiple Access (TDMA) Network, in particular a GSM network.

18. A method as claimed in claim 11 wherein said known path comprises a railway line, in particular a high-speed overground line.

19. A non-transitory computer readable storage medium carrying computer program code operable to, when running on a processor, implement a method of locating a mobile communications device on a known path, the mobile device communicating with a mobile communications network infrastructure including a plurality of base stations, communications between the mobile device and a base station to which it is attached having a timing advance to compensate for a time taken for a radio signal to reach the base station from the mobile device, the method comprising:
    reading a time ordered sequence of messages captured from said communications between the mobile device and said network infrastructure;
    reading timing advance information from said captured messages;
    identifying a step change in timing advance using said timing advance information;
    reading base station identification data from said captured messages, for identifying a base station to which the mobile device is attached at said time of said step change;
    reading base station location data for said identified base station; and
    determining a location of said mobile device on said known path at a time of said step change by determining an intersection of said path with a line having a position determined by said identified base station location and said timing advance immediately before or after said step change.

20. A computer system for locating a mobile communications device on a known path, the mobile device communication with a mobile communications network infrastructure including a plurality of base stations, communications between the mobile device and a base station to which it is attached having a timing advance to compensate for a time taken for a radio signal to reach the base station from the mobile device, the computer system comprising:
    an input for captured message data;
    a data store for storing said message data, timing advance data, and location data;
    program memory storing processor implementable instructions; and
    a processor coupled to said data memory and to said program memory for loading and implementing said instructions, said instructions comprising instructions for controlling the processor to:
    read a time ordered sequence of messages captured from said communications between the mobile device and said network infrastructure;
    read timing advance information from said captured messages;
    identify a step change in timing advance using said timing advance information;
    read base station identification data from said captured messages, for identifying a base station to which the mobile device is attached at said time of said step change;
    read base station location data for said identified base station; and
    determine a location of said mobile device on said known path at a time of said step change by determining an intersection of said path with a line having a position determined by said identified base station location and said timing advance immediately before or after said step change.

21. A computer system for a method of providing location data for one or more messages of a stream of messages captured from a mobile communications network, the messages comprising messages sent between a mobile communications device and a base station of the network whilst said mobile device was moving on a known path, at least some of the said messages including timing offset information specifying a timing offset relating to a propagation time of a said message between the mobile communications device and said base station, said timing offset information being quantised, the computer system comprising:
- an input for captured message data;
- a data store for storing said message data, timing advance data, and location data;
- program memory storing processor implementable instructions; and
- a processor coupled to said data memory and to said program memory for loading and implementing said instructions, said instructions comprising instructions for controlling the processor to:
- read said timing offset information from said captured stream of messages;
- identify a pattern in said timing offset information comprising a first and second series of substantially constant timing offsets separated by a step change in timing offset;
- determine a reference timing offset associated with said step change;
- determine at least one intersection of said known path with an arc centred on a location of a base station to which the mobile device is attached at a time of said step change and having a radius determined by said reference timing offset, to establish a reference point; and
- provide said location data for said one or more messages using said reference point.

* * * * *